July 22, 1958 H. SINGER 2,844,369

TAPE DRIVE MECHANISM

Filed Nov. 1, 1955

INVENTOR.
Herbert Singer
BY Morris A. Rabkin
ATTORNEY.

United States Patent Office 2,844,369

Patented July 22, 1958

2,844,369

TAPE DRIVE MECHANISM

Herbert Singer, West Collingswood, N. J., assignor to Radio Corporation of America, a corporation of Delaware Application November 1, 1955, Serial No. 544,118

6 Claims. (Cl. 271—2.18)

This invention relates to tape recorders of the type using a continuous loop of magnetic tape, and it has for its object to provide a novel and improved drive for such recorders.

Another object of the invention is to provide a simple and efficient mechanism for driving the tape in a device of the above type at two different speeds.

Still another object is to provide an improved two-speed drive employing a single motor.

Various other objects and advantages will be apparent as the nature of the invention is more fully disclosed.

The invention is especially applicable to recording systems of the type using an endless loop of magnetic tape, in which the tape is removed from the storage reel from the inner turn adjacent the hub and is fed back to the outer peripheral surface of said reel. A feature of the invention resides in the fact that a single motor is used to drive two tape-driving capstans; a rewind capstan which is driven at relatively high speed, and a playing or recording capstan which is driven at a speed commensurate with normal recording. In such system, of course, "rewinding" is actually fast forward winding.

In carrying out the invention, the fast capstan for rewinding and the slow capstan for recording are rotated simultaneously by a two-stage flexible belt drive from a single motor. A pressure roller positioned between the two capstans, and selectively actuated as by a pair of solenoids, is arranged to shift the tape from driving engagement with one capstan into driving engagement with the other capstan. When neither solenoid is actuated, the pressure roller moves to a neutral position in which the tape remains stationary.

Figure 1:
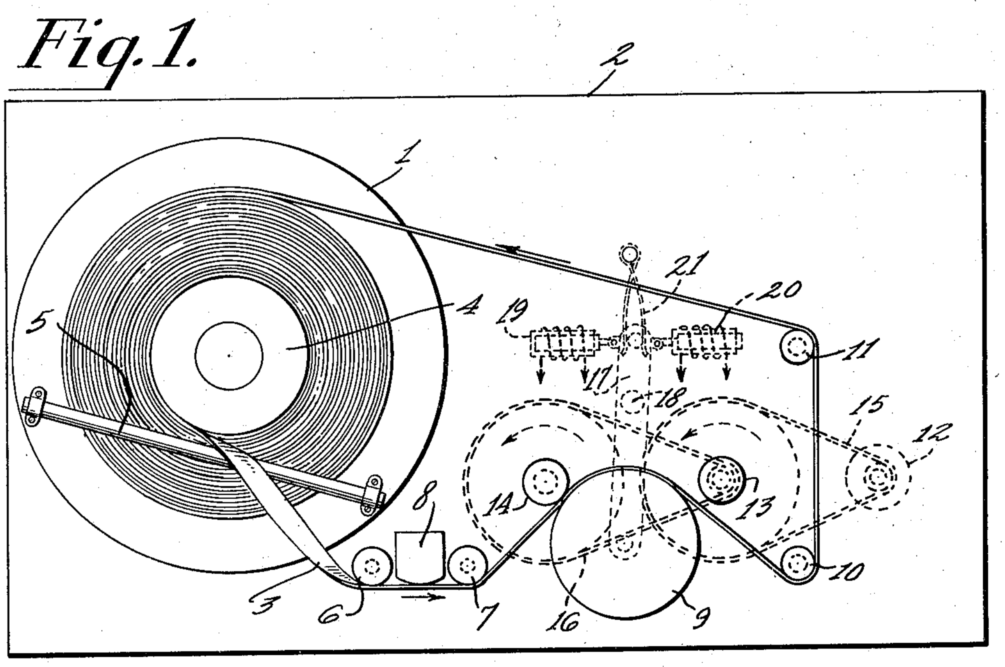
Figure 2:
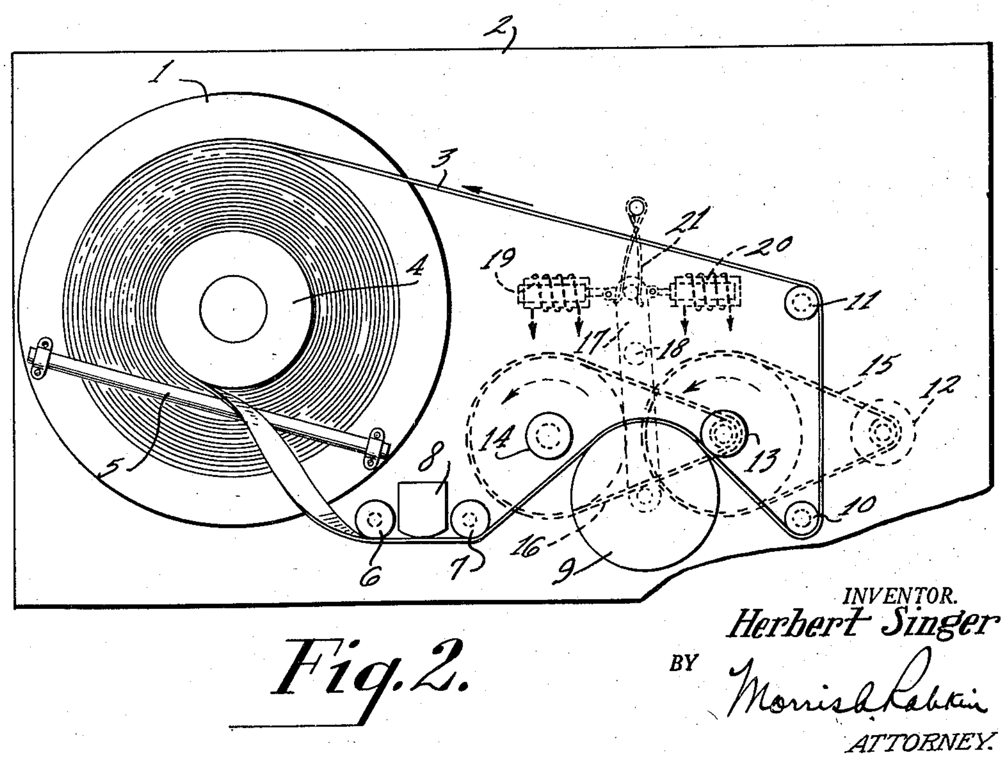

The invention is described more in detail in connection with the accompanying single sheet drawing, in which:

Fig. 1 is a top plan view illustrating a preferred embodiment of the invention with the parts in position to drive the tape at normal recording speed; and Fig. 2 is a similar view showing the pressure roller shifted to driving engagement with the tape on the rewind capstan for fast rewinding.

The drawing shows a storage reel 1 mounted on a platform 2 and containing an endless loop of magnetic tape 3 which, in the operation of the device, is unwound from the inner turn adjacent the hub 4 and is fed back to the outer peripheral surface of the reel, in accordance with a practice well understood in the art.

The tape 3, in unwinding from the center of the reel, passes over guard rail 5, guide rollers 6 and 7 on opposite sides of recording head 8, idler pressure roller 9, and guide rollers 10 and 11, back to the outside of the reel. The mechanism for driving the tape comprises a single motor 12 driving rewind capstan 13 and recording capstan 14 through a two-stage reduction drive including flexible belts 15 and 16. In a typical embodiment of the invention, for example, the motor 12, operating at 6,000 R. P. M., drives rewind capstan 13 through belt 15 at 3,600 R. P. M., while belt 16 drives recording capstan 14 at 240 R. P. M.

The pressure roller 9, positioned between capstans 13 and 14, is rotatably mounted on a supporting arm 17 which is pivoted at 18 to a fixed support and is actuated by a pair of solenoids 19 and 20. When solenoid 20 is energized, it swings the arm 17 in a clockwise direction about its pivot 18, thus pressing tape 3 into frictional driving engagement with recording capstan 14, which is the position of the parts as illustrated in Fig. 1. The capstan 14 thus drives the tape 3 at normal recording speed.

On the other hand, when solenoid 19 is energized it shifts the arm 17 in a counter-clockwise direction about its pivot 18, thus pressing tape 3 into frictional driving engagement with the "fast" rewind capstan 13, this being the position of the parts as illustrated in Fig. 2. The capstan 13 accordingly drives the tape 3 at a fast rewinding speed.

When neither of the solenoids 19 or 20 is energized, a suitable spring 21 moves the arm 17 about its pivot 18 to an intermediate neutral position in which the pressure roller rests midway between the capstans 13 and 14 and the tape 3 therefore remains stationary.

It will be evident from the foregoing that the invention provides a simple, efficient and economical mechanism employing a single source of power for selectively winding and unwinding a recording tape at two different speeds.

What is claimed is:

1. A tape recorder of the type employing a reel containing a continuous tape which is adapted to unwind from the inner turn adjacent the hub of said reel and to rewind about the outer peripheral surface of said reel, said recorder comprising a pair of spaced rotatable capstans in the path of travel of said tape, an idler pressure roller continuously engaging said tape and positioned between said capstans, a pivoted support for said roller, actuating means for shifting said support about its pivot to move said roller into selective tape-driving engagement with said capstans, and driving means for said capstans including a power source and means between said power source and said capstans for driving the respective capstans at two different speeds.

2. A tape recorder according to claim 1, in which the driving means for said capstans comprises a motor, a driving connection between said motor and one capstan for driving the latter at one speed, and a reduction driving connection between said one capstan and the second capstan for driving the latter at a slower speed.

3. A tape recorder according to claim 1, in which the driving means for said capstans comprises a motor, a flexible reduction belt drive between said motor and one capstan for driving the latter at a reduced speed, and a second flexible reduction belt drive between said one capstan and the other capstan for driving the latter at a still slower speed.

4. A tape recorder according to claim 3, in which the actuating means for shifting said roller support about its pivot comprises a pair of solenoids selectively operable to shift said support to either of two limiting operative positions, and means operable upon the deenergization of both solenoids for shifting said support to an intermediate neutral position to stop the movement of said tape.

5. Mechanism for driving an elongated, flexible medium over a predetermined path comprising a pair of rollers for driving said medium spaced from each other on one side of said path, means for applying driving torque to each of said pair of rollers for driving said medium in at least two different manners, a single idler roller disposed on the side of said path opposite from said driving rollers, and means for moving said idler roller and a selected one of said driving rollers with respect to each other to engage said medium therebetween for driving said medium in a selected one of said different manners.

6. Mechanism for driving an elongated, flexible medium over a predetermined path comprising a pair of rollers for driving said medium spaced from each other along one side of said path, a drive shaft, means for coupling said driving rollers in tandem to said drive shaft to provide for the drive of said rollers in two different manners, a pressure idler roller disposed on the side of said path opposite from said driving rollers, shiftable mounting means for said pressure roller, and means for shifting said mounting means towards a selected one of said driving rollers for engaging said medium in driving contact therewith.

References Cited in the file of this patent

UNITED STATES PATENTS

| | | |
|---|---|---|
| 2,620,404 | Pond | Dec. 2, 1952 |
| 2,699,332 | MacKenzie | Jan. 11, 1955 |
| 2,732,144 | Jones | Jan. 24, 1956 |